United States Patent [19]

Hopkinson

[11] 4,134,539
[45] Jan. 16, 1979

[54] CODE IDENTIFICATION APPARATUS

[75] Inventor: Dennis Hopkinson, Newport, Australia

[73] Assignee: Access Control Systems Pty Ltd., Australia

[21] Appl. No.: 843,833

[22] Filed: Oct. 20, 1977

[30] Foreign Application Priority Data

Nov. 24, 1976 [AU] Australia .............................. PC8252

[51] Int. Cl.² ...................... G06K 7/08; G06K 13/06; G06K 19/06

[52] U.S. Cl. .................................... 235/449; 235/482; 235/493

[58] Field of Search ............... 235/449, 450, 454, 458; 360/2

[56] References Cited

U.S. PATENT DOCUMENTS

| | | | |
|---|---|---|---|
| 3,634,657 | 1/1972 | Ballard et al. ...................... | 235/449 |
| 3,953,712 | 4/1976 | Horvath .............................. | 235/449 |
| 3,959,627 | 5/1976 | Sonier ................................. | 235/458 |
| 3,993,893 | 11/1976 | Graf .................................... | 235/458 |
| 4,002,887 | 1/1977 | Ouimette ............................. | 235/449 |

*Primary Examiner*—Daryl W. Cook
*Attorney, Agent, or Firm*—Biebel, French & Nauman

[57] ABSTRACT

Access control system in which a magnetically coded key or card is inserted into a reader which reads the recorded code. The key is coded by small permanent magnets embedded in non-magnetic body of key at positions on a 4 × 4 regular grid of possible positions. The reader includes row of 4 Hall Effect sensors adjacent keyway entrance so that the 4 rows of magnet positions pass successively across them. Signals generated in sensors are transmitted to signal storage units and extracted from the storage units on withdrawal of the key. Activation of sensors and transmission of signals is controlled by successive interruption by leading edge of key of light beams along the keyway.

10 Claims, 13 Drawing Figures

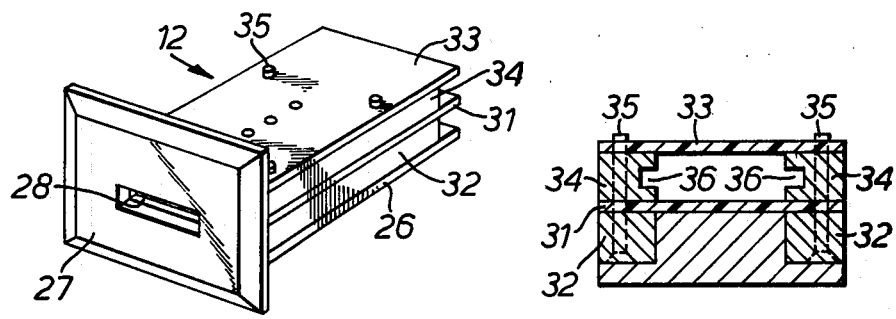
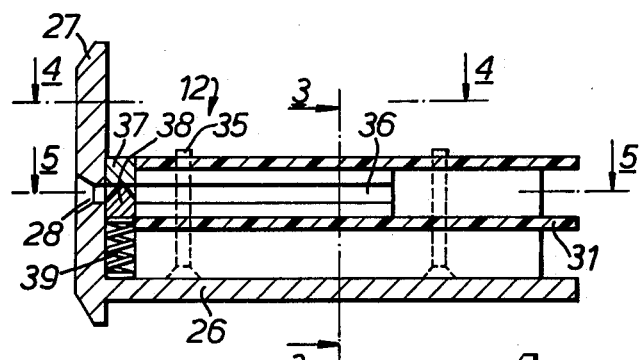
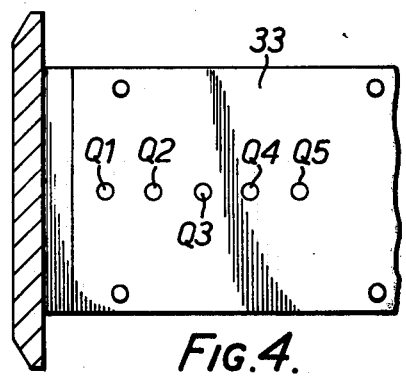
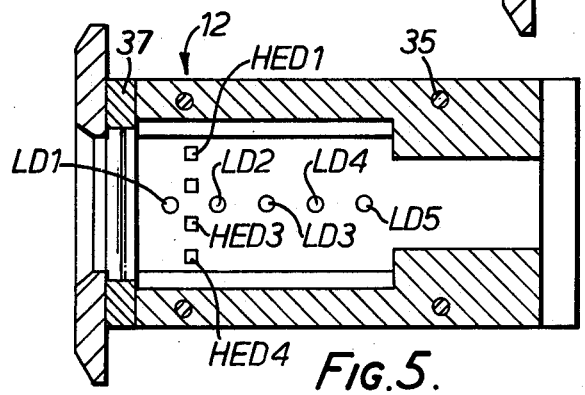
FIG.1.   FIG.3.   FIG.2.   FIG.4.   FIG.5.

CODE IDENTIFICATION APPARATUS

BACKGROUND OF THE INVENTION

This invention relates to code identification apparatus of the type in which an instrument such as a key or card having a code recorded on it is submitted to a reader which reads the recorded code. Apparatus of this type may be used in locking systems and various accounting and credit control facilities. In the case of a locking system the reader would control the condition of a lock and the coded instrument would normally be in the form of a key which is inserted into the reader. In the case of credit control systems the instrument would usually be in the form of a coded card.

The invention has particular, but not exclusive application to apparatus in which the instrument is magnetically coded, for example by the inclusion of small magnets at selected locations within a magnetic body of the instrument. Australian Pat. No. 65612/74 and granted U.S. Pat. No. 3,953,712 disclose an apparatus of this type in which a magnetically coded instrument is inserted into a guideway of a reader which includes a number of sensing coils disposed adjacent the guideway such that electromotive forces are generated in the sensing coils by movement of the magnetised portions of the instrument across them as the instrument approaches the end of its forward travel along the guideway. The electromotive forces generated in the sensing coils are amplified and influence the condition of an output circuit so as to cause generation of an output signal. Co-pending Australian patent application no. PC 7034/76 corresponding to U.S. patent application Ser. No. 769,532, filed Feb. 17, 1977, also discloses an apparatus in which a magnetically coded instrument is inserted into a guideway of a reader which reads its code. In that case the magnetised portions of the instrument are detected by a series of Hall Effect devices disposed within the reader adjacent the guideway.

In both of the above described arrangements the number of sensing elements incorporated in the reader is equal to the number of coding locations on the instrument and the code is read virtually instantaneously when the instrument approaches or reaches the end of its forward travel. The present invention provides an alternative arrangement which permits the number of sensing elements to be reduced.

SUMMARY OF THE INVENTION

According to the invention there is provided code identification apparatus comprising a coded instrument having a set of code locations arranged in a line along the instrument and a code reader to which to apply the instrument, said reader comprising:

a body defining an instrument guideway along which to move the instrument with said line of code locations aligned with the direction of movement of the instrument;

sensor means including a sensor element mounted on the body such that said code locations of the instrument successively pass that sensor element as the instrument is moved along the guideway, which sensor means provides output signals indicative of code information at said code locations as those locations pass the sensor element; and signal storage means to store signals provided by the sensor means.

Preferably said signal storage means comprises a plurality of signal storage units at least equal in number to the number of code locations in said set and the reader further comprises control means responsive to progress of the instrument along the guideway to connect said storage units in succession to the sensor element as the code locations of the instrument successively pass the sensor element.

Preferably, too, the apparatus includes means to extract the stored signals from said storage units on withdrawal of the instrument from the guideway.

The sensor means may include comparator means to receive an initial output from said sensor element and to compare subsequent instantaneous values of the output of the sensor element with the value of the initial output to derive said output signals.

The sensor element may be a Hall Effect device and the instrument may include one or more discrete magnetized portions at one or more of said locations to influence an electrical output of the Hall Effect device whereby to generate said signals.

Preferably said set of code locations of the instrument is one of a plurality of similar sets arranged in parallel lines with the locations of the sets aligned with one another transversely of the lines so as to form a rectangular grid mixture of locations; said sensor element is one of a plurality of sensors equal in number to the number of said sets and spaced so that each is passed successively by the code locations of one of the sets as the instrument is moved along the guideway; and said control means connects all of said storage units in succession to each of the sensor elements.

BRIEF DESCRIPTION OF DRAWINGS

In order that the invention may be more fully explained one particular embodiment will be described with reference to the accompanying drawings in which:

FIG. 1 is a perspective view of a reader to read magnetically coded keys;

FIG. 2 is a vertical cross-section through the reader of FIG. 1;

FIG. 3 is a cross-section on the line 3—3 in FIG. 2;

FIG. 4 is a cross-section on the line 4—4 in FIG. 2;

FIG. 5 is a cross-section on the line 5—5 in FIG. 2;

DESCRIPTION OF PREFERRED EMBODIMENT

The illustrated apparatus is generally similar in layout to those described in Australian Patent application No. 65612/74, granted U.S. Pat. No. 3,953,712 and Australian patent application No. PC 7034/76.

The system makes use of an instrument 11 in the shape of a key which is fitted with a number of magnets at selected positions in a matrix of possible positions. There may, as illustrated, be sixteen possible positions disposed in a 4 × 4 matrix. The key is inserted into a reader 12 fitted with a number of sensor elements in which signals are generated by the presence of the magnets. These signals may be used to initiate various functions depending on the particular application of the system.

Figure 6:
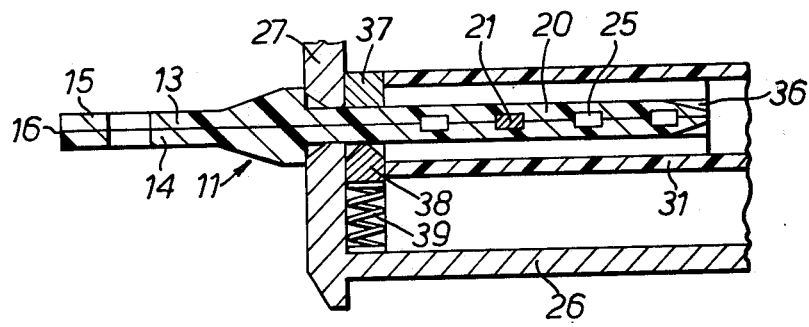
FIG. 6 is an enlarged cross-section of part of the reader shown during insertion of a magnetically coded key.
Figure 7:
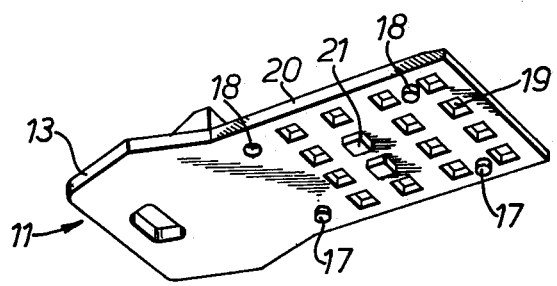
FIG. 7 is a perspective view of part of the key.

As seen in FIGS. 6 and 7 instrument 11 is comprised of a pair of body portions 13, 14 which fit together at a flat interface 16 to form a key shaped body having a head 15 and a rectangular flat plate part 20. The two body portions are identical. They are moulded from tough non-magnetic plastics material such as glass fibre reinforced nylon and have interengaging pegs 17 and holes 18 at the interface 16. At this interface they are also each provided with sixteen recesses 19 arranged in a 4 × 4 matrix so that when the two body portions are fitted together sixteen closed pockets 25 are formed within the key and the key is coded by the inclusion of small permanent magnets 21 within selected pockets of the matrix. Magnets 21 may be formed as small discs or cylinders of permanently magnetized metal, i.e. they may be unisotropic magnets. It would, however, be possible to install isotropic magnets which would lose their magnetism after a set period so enabling the issue of keys which would be effective for a limited period only. The key is coded according to the number and disposition of magnets 21 in the matrix of sixteen pockets. It will be appreciated that with the sixteen positions available for installation of magnets and the fact that the polarity of the magnets may be reversed simply by physical inversion of the number of possible code combinations is very large indeed.

Reader 12 comprises a body defining a base plate 26 and an escutcheon plate 27 which has a slot 28 through which to insert the magnetically coded front plate part 20 of key 11 into reader unit 12.

The reader unit 12 comprises a lower printed circuit board 31 which is mounted above base plate 26 and is held spaced from the base plate by two spacer strips 32 disposed one to each side of the reader unit. An upper printed circuit board 33 is mounted above the lower printed circuit board and the two printed circuit boards are held spaced apart by two other spacers 34 which are also disposed one to each side of the reader unit. The printed circuit boards and the spacers 32, 34 are held together by means of long studs 35 which extend upwardly through them on each side of the reader unit.

The inner edges of spacers 34 are provided with slots 36 which are at the same height above base plate 26 as slot 28 in escutcheon plate 27. The coded front plate part 20 of key 11 can be inserted through slot 28 into the cavity defined between spacers 34 and the upper and lower printed circuit boards and the two side edges of the key then engage slots 36 which serve as a guideway for movement of the key.

A yoke member 37 mounted on base plate 26 immediately behind escutcheon plate 27 provides a slideway for vertical sliding movement of a guideway barrier member or gate 38. Gate 38 is normally biased upwardly by biasing springs 39 so as to block the key guideway entrance. Its upper edge is chamfered so that on insertion of the key it is wedged downwardly and does not impede entry of the key into the guideway but it does provide an effective seal against entry of dust or other foreign material when the key is withdrawn.

Reader unit 12 may be held on base plate 26 by means of heat shrunk plastic tubing (not shown).

Lower printed circuit board 31 carries five light emitting diodes LD1, LD2, LD3, LD4 and LD5 which are arranged in a straight line concentrically of the guideway. The circuit board also carries appropriate circuitry to activate these light emitting diodes as will be described below. Four Hall Effect devices HED1, HED2, HED3 and HED4 are arranged generally in a row transverse to the guideway and near to the guideway entrance. Devices HED3 and HED4 are mounted on the lower circuit board and devices HED1 and HED3 on the upper board. The spacing of these devices is such that when the key is inserted into the guideway the four columns of magnets pass one across each of the Hall Effect devices.

Upper circuit board 33 also carries five photo-transistors Q1 – Q5 which are vertically aligned with the light emitting diodes LD1 – LD5.

Figure 8:
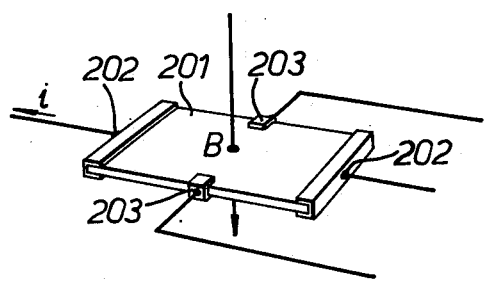
FIG. 8 is a diagrammatic representation of a Hall Effect device.

The basic principles of operation of a Hall Effect device is shown diagrammatically in FIG. 8. As shown in this Figure a Hall Effect device generally comprises a semiconductor layer 201 fitted with a pair of control current electrodes 202, through which to pass a control current through the layer in one direction and a second pair of electrodes 203 to detect a potential difference between locations on the semi-conductor layer which are spaced apart in a direction transverse to the direction of the control current. When a control current i is passed via electrodes 202 through the semi-conductor layer 201 whilst a magnetic field of flux density B is perpendicular to the plane of the semi-conductor a potential difference (open circuit Hall voltage V) is developed between electrodes 203, in accordance with equation $V = R_h/d \cdot i \cdot B$ where $R_h$ is a constant (Hall constant) of the semi-conductor material and d is the thickness of the semi-conductor layer.

Hall Effect devices which operate in the manner indicated in FIG. 8 can be obtained commercially. Generally the semi-conductor layer is formed either as a wafer produced from semi-conductor bars by cutting, grinding and etching; as a layer which is vapour deposited on a chip; or as GaAs layer grown epitaxially from the gas phase on semi-insulating GaAs.

It has been found that Hall Effect devices known as HONEYWELL TYPE 63SS2C are particularly suitable for use in the illustrated apparatus. These devices have sensors and amplifiers integrated into the same sensing chips so as to provide an amplified output signal. They are, in fact, capable of providing two amplified outputs one being a "true" output and the other a "compliment" of the first output. Only one of these outputs need be used in the illustrated apparatus. The device has an output of ± 0.9mV/Gauss over a sensitivity range of ± 400 Gauss with a constant supply voltage of 5vDC ± 5% and at a temperature of 24° ± 2° C.

The potential difference generated by each Hall Effect device is of the order of only 400 millivolts. This presents a signal having a polarity dependent upon the direction of the magnetic field applied to the Hall Effect device, i.e. a key magnet which registers with the Hall Effect device with its north pole facing that device will generate a Hall Effect potential difference on one polarity, whereas a key magnet which registers with its south pole facing the Hall Effect device will generate a potential difference of opposite polarity.

Figure 9:
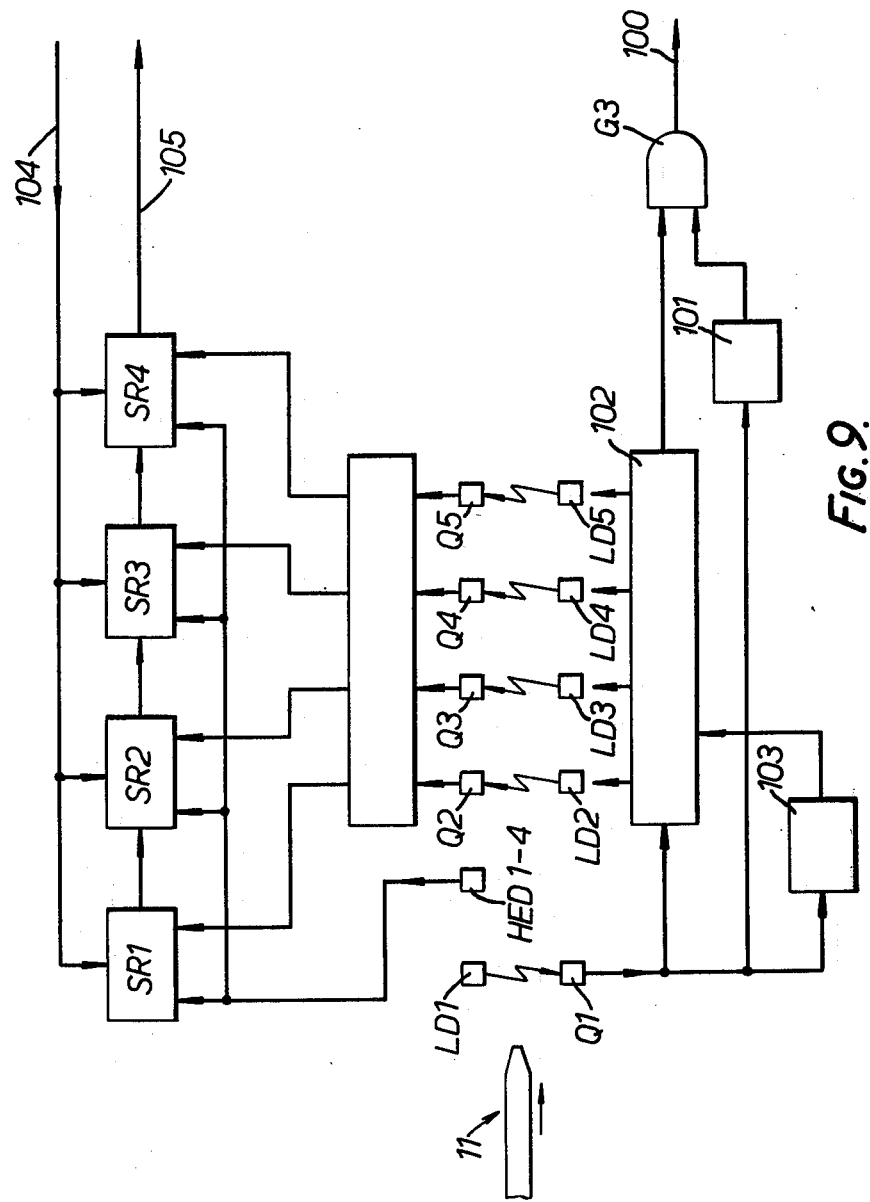
FIG. 9 is a block diagram of the electrical circuit of the reader.

Before describing the electrical circuitry of the reader in detail the general operating principles of the apparatus will be described with reference to FIG. 9.

Before the key is inserted into the reader, light emitting diode LD1 is operative to produce a light beam which is detected by photo-transistor Q1 on the upper circuit board. However, the other four light emitting diodes LD2 – LD5 are then inactive. As the key is inserted into the guideway it pushes gate 38 downwardly and interrupts the light beam produced by diode LD1. The resulting signal at photo-transistor Q1 triggers a timing circuit, indicated in block form as 102 in FIG. 9, which applies a timing signal to one side of an AND gate G3. This timing signal continues for a fixed time determined by the timer circuitry.

The signal from photo-transistor Q1 is also applied to a "sequencing logic" 102. As will be described more fully below sequencing logic 102 is an integrated circuit quinary counter which can be switched progressively through five successive conditions $Q_0$, $Q_1$, $Q_2$, $Q_3$, $Q_4$, $Q_5$. Its purpose is to activate light emitting diodes LD2 – LD4 successively as the light beam produced by the immediately preceding light emitting diode is cut by the key and, when all of the light beams have been cut in proper sequence, to apply an output signal to AND gate G3.

When the signal from photo-transistor Q1 produced by cutting of the first light beam is applied to sequencing logic 101, that logic is switched from its $Q_0$ condition to its $Q_1$ condition which causes light emitting diode LD2 to be activated to produce a light beam which is detected by photo-transistor Q2.

As the key progresses further along the guideway the first row of key magnet locations passes over Hall Effect devices HED1 – HED4. When a magnet passes over one of the Hall Effect devices the output voltage of that device increases or decreases according to whether the north pole or south pole of the magnet is facing the device. Thus it is possible by checking the voltage outputs of the Hall Effect devices as the first row of magnet locations passes over them to determine the presence or absence of magnets and, if present, to determine the respective magnetic polarities.

The second light beam produced by light emitting diode LD2 is positioned so that it is cut by the leading edge of the key at the instant the first row of magnet locations is over the Hall Effect device and the resulting signal produced by photo-transistor Q2 causes the signals indicating the positions and polarities of the magnets in that row to be stored in a first storage unit SR1. The interruption of the second light beam also switches sequencing logic 101 to its $Q_2$ state which activates the third light emitting diode LD3 to produce a light beam detected by photo-transistor Q3.

As the key progresses further along the guideway it successively cuts each light beam which has been produced by interruption of the immediately preceding beam and the signals representing the positions and polarities of magnets in the second, third and fourth rows of the key are stored at the appropriate times in three further storage units SR2, SR3 and SR4.

When the last light beam is cut sequencing logic 102 transmits a signal to AND gate G3 and if this signal is produced within the fixed time interval determined by entry timer 101 AND gate G3 produces a "data ready" signal which is transmitted via output line 100 to a central processing unit located remotely from the reader. Sequencing logic 102 ensures that the key is inserted in one movement and within the time interval determined by entry timer 101. It is therefore not possible to operate the reader by jiggling a key or other magnetic device back and forth within the guideway.

When the key is withdrawn to remake the light beam produced by diode LD1 the resulting signal at photo-transistor Q1 activates a "wait timer" circuit 103. The wait timer sends a signal to the central processing unit causing that unit to send 32 clock pulses to store units SR1 – SR4 via an input line 104 to transfer the data stored in those units to the central processing unit via an output line 105. After a fixed wait interval the wait timer also produces a further signal which is transmitted to sequencing logic 102 to reset the sequencing logic back to its initial $Q_0$ to enable the whole sequence to be repeated.

Figure 10:
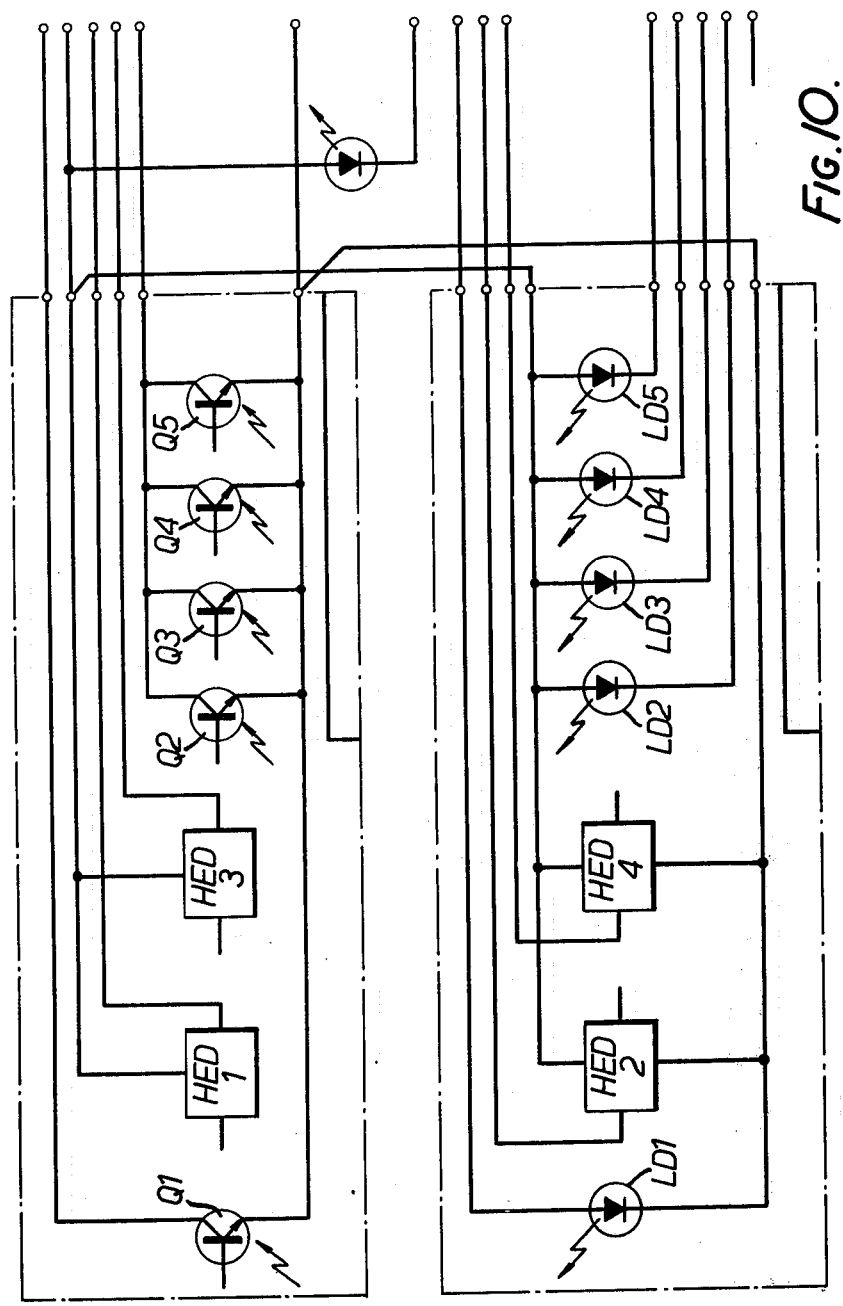
FIG. 10 is a circuit diagram showing part of the circuit of the reader.
Figure 11A:
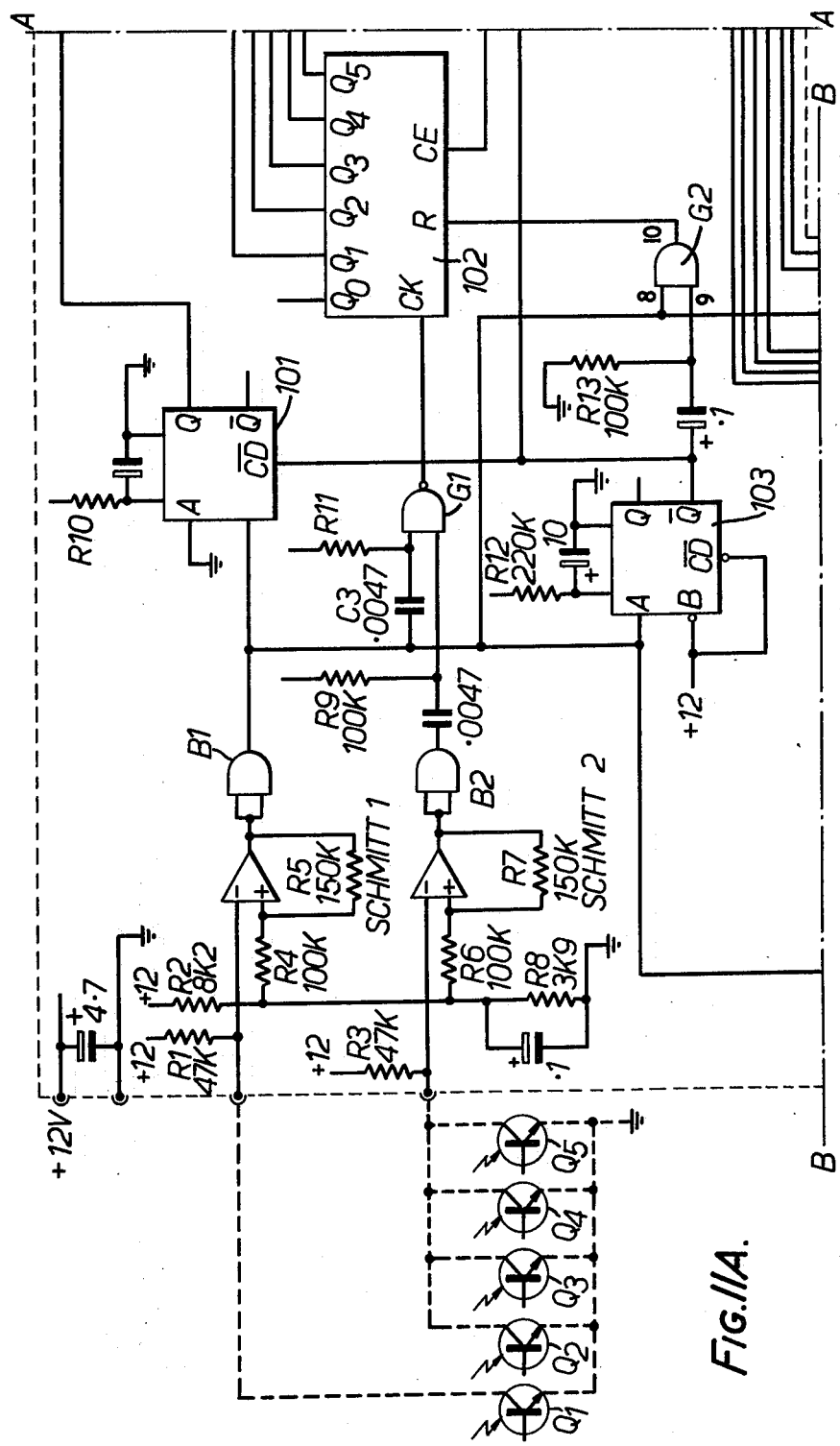
FIGS. 11A, 11B and 11C join at the lines A—A and B—B to form a composite FIG. 11 illustrating the remainder of the electric circuit of the reader.
Figure 11B:
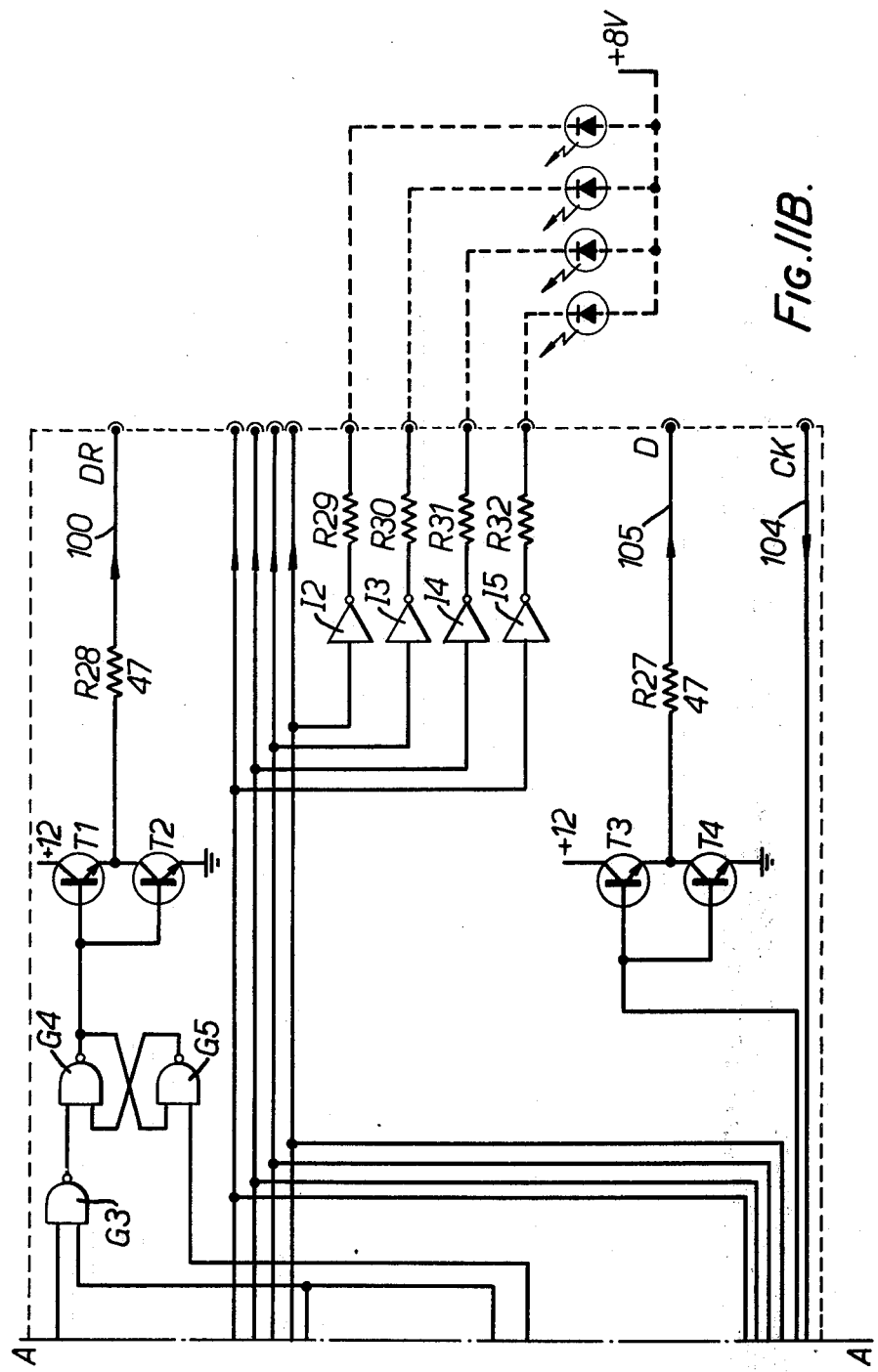
Figure 11C:
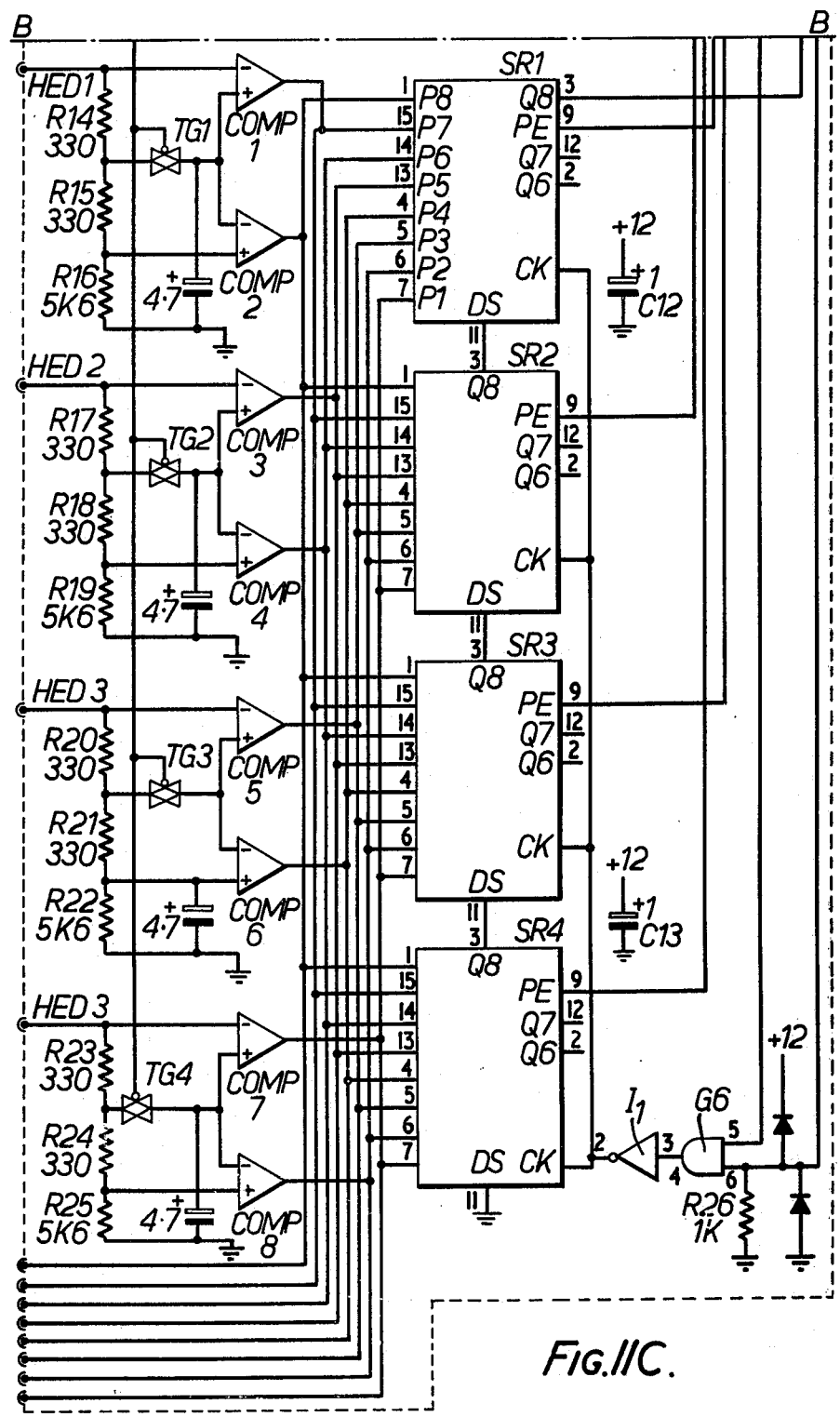

The electric circuit will now be described in more detail with reference to FIGS. 10 and 11 which are detailed circuit diagrams. As indicated in these figures the four storage units SR1, SR2, SR3 and SR4 may be standard type 4021 shift registers.

Entry timer 101 is a mono-stable multivibrator which produces a pulse of a fixed time duration, for example ⅜ of a second, and wait timer 103 is a similar mono-stable multivibrator.

Schmitt triggers, Schmitt 1 and Schmitt 2 are incorporated in the circuit to sharpen up the slow moving wave forms produced by interruption of the light beams by the relatively slow movement of the key within the guideway.

Hall Effect devices HED1 – HED4 are connected into sensor circuits which include eight comparators COMP1 – COMP8, four capacitors C8 – C11, and gates TG1 – TG4. The reason for this circuitry is that the outputs of the Hall Effect devices tend to drift with time due to temperature effects. Each Hall Effect device may have a standard output voltage of approximately 3 to 4 volts. The key magnets may produce a signal of only about ± 0.75 volts in this output but the drift in output voltage over long time intervals may be greater than this signal variation. The illustrated circuitry overcomes this problem by effectively taking snap readings of the Hall Effect output voltages at the time the first light beam is cut, holding these as reference values by means of capacitors C8 – C11 and deriving data signals by consequently comparing these reference values with the instantaneous output values at the times that the successive light beams are cut. Each Hall Effect device is connected to two of the comparators, one to read if the signal goes higher than the reference and the other to read whether it goes lower.

The sensor circuit incorporating Hall Effect device HED1 will be described in detail and it will be seen from FIG. 11 that the circuits with the other Hall Effect devices are the same.

The standing output voltage of the Hall Effect device, which is in the region of 3 to 4 volts is applied to the three series resistors R14, R15 and R16. The centre point of R14 and R15 is taken to a capacitor C8 via a transmission gate TG1. In the normal condition, i.e. no key in the reader, the transmission gate is at low resistance and therefore the voltage on the capacitor follows the voltage at the junction of R14 and R15 which changes due to temperature effects in the Hall device. This voltage is applied to the non-inverting input of voltage comparator COMP1 and the inverting input of COMP2. The inverting input of COMP1 is taken to the more positive end of R14 and therefore its output is low. The non-inverting input of COMP2 is taken to the more negative end of R15 and therefore its output is also low.

When the key is inserted in the reader the transmission gate is switched off i.e., becomes very high resistance and C8 "remembers" the voltage at the resistor junction prior to key being inserted. If a magnet in the key has, say, its north pole facing upwards, the voltage at the HED1 input rises and the junction of R15, R16 rises above the voltage stored on C8 and the COMP2 output goes high. If the magnet faces the other way, the voltage at the HED1 input falls and the inverting input of COMP 1 falls below the value of that stored on C8 and the output of COMP1 goes high. If no magnet is present both outputs remain low. Because the outputs of the comparators are only clocked into the shift registers at the correct instant, it can be said that the 2 bit code for any one magnet is as follows:

|  | COMP 1 | COMP 2 |
|---|---|---|
| NO MAGNET | Low | Low |
| MAGNET N. | Low | High |
| MAGNET S. | High | Low |

Detailed operation of the circuit will now be described with reference to FIGS. 10 and 11.

In the quiescent state i.e. with no key in the reader, only the first light beam is operative and the reader Q1 collector is low, forcing the output of schmitt 1 high. As LD2 – LD5 are not active the collectors of Q2 – Q5 are high, forcing the output of schmitt 2 low.

As the key enters, breaking the first light beam, schmitt 1 changes state, firing the entry timer multivibrator 101, via buffer B1, and at the same time switching off transmission gates TG1 – TG4, and pulsing logic counter 102, to its Q1 state via capacitor C4 and OR gate G4. The entry timer Q output going high, enables one input of AND gate G3 whose output does not go low due to the other input being held low by Q5 of the counter.

Q1 of the counter going high, energises the second light emitting diode LD2, causing the input of schmitt 2 to go low, and forcing the output high. The key then breaks this light beam and the input of schmitt 2 goes high, forcing its output low and pulses the clock input of the counter 102 via capacitor C3 and gate G1. The counter advances to its Q2 state and the Q1 output going low, clocks the parallel information from the magnet comparators COMP1 – COMP8, into shift register SR2. SR2 now contains the magnet information of the first row of magnets in the key.

Q2 of the counter energises the third light beam, and as this is cut the counter advances to its Q3 state in a similar manner to that already described, and the Q2 output, going low clocks the second magnet row data into SR4. Similarly, the key entering further cuts beams 4 and 5, clocking rows 3 and 4 magnets data into SR1 and SR3 respectively.

As the last beam is cut the counter is clocked to its Q5 state, and Q5 going high stops the counter by taking CE high and enables the other input of gate G3, whose input is already enabled by the Q outputs of the entry timer 101. The output of gate G3 therefore goes low, setting the flip flop formed by gates G4 and G5, and the "data ready" line 100 goes high, driven from the flip flop via T1 and T2.

As the key is withdrawn, the first light beam is remade, putting a low signal on the input of schmitt 1 and so forcing its output high, which re-opens the transmission gates TG1 – TG4, enables one input of gate G2 and fires the wait timer multivibrator 103. The output of the multivibrator 103 then goes low and inhibits the entry timer multivibrator 101 on its CD input, and also resets flip flop G4, G5 and the "data ready" output goes low, requesting the central processing unit to send 32 clock pulses to move the stored data in SR1 – SR4 out to the central processing unit via the buffer transistors T3,T4.

At the end of the wait period, provided a key has not been re-inserted, the rising edge of the output signal of the wait timer multivibrator 103 pulses the reset input of the logic counter 102 which reverts to its $Q_0$ state. At the same time the CD input is enabled on the entry timer multivibrator 101 allowing the sequence to be repeated. If a key is inserted during the wait period gate G2 is inhibited and prevents the counter resetting at the end of the wait period. If the key is inserted and withdrawn within the wait period, the wait period recommences due to the retriggerable nature of the mono-stable multivibrator 103.

In the illustrated apparatus only four sensor devices are required to read a code spread over 16 coding locations as compared with prior art devices in which it is necessary to provide as many sensors as there are code locations. Moreover the key must be inserted so as to cut the light beams in proper sequence and to complete its movement within a given time interval. Data stored in the store units is only transferred to the central processing unit on withdrawal of the key there is no output from the reader until the key is withdrawn. There is therefore no danger that a key will be allowed to remain in the reader inadvertently. Moreover, the use of comparators in the sensor circuitry enables the use of Hall Effect devices which might otherwise give problems due to drift in their output voltages. However, the illustrated apparatus has been advanced by way of example only and it could be altered considerably without changing the general principles of operation. For example, it is not essential to use Hall Effect devices as the sensor elements and other means for sensing the code could be used. It would be possible to use sensor coils to produce signals consequent to movement of the key magnets across them, to produce signals by blocking a magnetic field with discs fitted to the key or to fit the key with segments of different electrical conductivity to be read by wipers in the reader.

It would also be possible to provide other means to switch the light beams in proper sequence. For example, it would be feasible to use simple micro-switches or a mechanical device operated by teeth at the edge of the key.

It is accordingly to be understood that the invention is in no way limited to the details of the illustrated apparatus and that many modifications and variations will fall within the scope of the appended claims.

I claim:

1. Code identification apparatus comprising a coded instrument having a set of code locations arranged in a line along the instrument and a code reader to which to apply the instrument, said reader comprising:

a body defining an instrument guideway along which to move the instrument with said line of code locations aligned with the direction of movement of the instrument;

code sensor means including a code sensor element mounted on the body such that said code locations of the instrument successively pass said sensor element as the instrument is moved along the guideway, which sensor means provides output signals indicative of code information at said code locations as those locations pass said sensor element;

signal storage means comprising a plurality of signal storage units at least equal in number to the number of code locations in said set;

instrument position sensors comprising a first instrument position sensor adjacent the entrance of the guideway and a series of further instrument position sensors spaced along the guideway at the same spacing as said line of code locations of the instrument and each of said position sensors associated with one of said code storage units, said series of instrument position sensors providing in response to progress of said instrument along said guideway a succession of signals each causing connection of the associated storage unit to said code sensor element whereby to connect said storage units in succession to said code sensor element as said code locations of the instrument successively pass said code sensor element, said series of instrument position sensors being normally inactive and said first instrument position sensor adjacent the entrance of said guideway being responsive to entry of said instrument into said guideway to render the first of said series of instrument position sensors active, the remaining instrument position sensors of said series being rendered active sequentially each in response to generation of a signal by the immediately preceding instrument position sensor in said series.

2. Code identification apparatus as claimed in claim 1, wherein said instrument position sensors are each comprised of a radiation emitter to emit a beam of radiation across said guideway and a radiation detector to detect the beam of radiation and to provide a signal when said beam is interrupted by said instrument.

3. Code identification apparatus comprising a coded instrument having a set of code locations arranged in a line along said instrument and a code reader to which to apply said instrument, said reader comprising:

a body defining an instrument guideway along which to move said instrument with said line of code locations aligned with the direction of movement of the instrument;

code sensor means including a code sensor element mounted on said body such that said code locations of the instrument successively pass said sensor element as said instrument is moved along said guideway, which sensor means provides output signals indicative of code information at said code locations as said locations pass the sensor element;

signal storage means to store signals provided by said sensor means, said signal storage means comprising a plurality of signal storage units at least equal in number to the number of code locations in said set;

means to extract stored signals from said storage units; and control means responsive to progress of said instrument along said guideway to code said storage units in succession to the code sensor elements as said code locations of said instrument successively pass said code sensor element, said control means comprising a series of instrument position sensors spaced along said guideway at the same spacing as said line of code locations of said instrument and each associated with one of said storage units, which instrument position sensors provide in response to progress of said instrument along said guideway a succession of signals each causing connection of the associated storage unit to said code sensor element;

wherein said instrument position sensors are also connected to a sequencing logic device which produces an output signal conditional upon generation of signals by all of said instrument position sensors in a correct sequence and operation of the means to extract the store signals from said storage units is conditional upon generation of said output signal from the sequencing logic device.

4. Code identification apparatus as claimed in claim 3, further comprising an additional sensor adjacent the entrance to the guideway to respond to entry of the instrument into the guideway to activate a timer which produces a timing signal of fixed duration and wherein the outputs of the timer and said sequencing logic device are connected to said means to extract said stored signals from said storage units via an AND gate, whereby said instrument position sensors must all produce signals in proper sequence within said predetermined time interval for operation of said means to extract said stored signals from said storage units.

5. Code identification apparatus as claimed in claim 4, wherein said means to extract the stored signals from said storage units is responsive to said additional sensor such that extraction of said stored signals from said storage units is initiated by said additional sensor on withdrawal of said instrument from said guideway.

6. Code identification apparatus as claimed in claim 4, wherein said instrument position sensors are normally inactive, the first of said instrument position sensors is rendered active by said additional sensor in response to entrance of said instrument into said guideway and the remaining instrument position sensors are rendered active sequentially, each in response to generation of a signal by the immediately preceding instrument position sensor.

7. Code identification apparatus as claimed in claim 4, wherein said instrument position sensors and said additional sensor are each comprised of a radiation emitter to emit a beam of radiation across the guideway and a radiation detector to detect said beam of radiation and to provide a signal when said beam is interrupted by said instrument as it progresses along said guideway.

8. Code identification apparatus comprising a coded instrument having a set of code locations arranged in a line along said instrument and a code reader to which to apply said instrument, said reader comprising:

a body defining an instrument guideway along which to move said instrument with said line of code locations aligned with the direction of movement of said instrument;

code sensor means to provide output signals indicative of code information at said code locations as those locations pass said sensor element, said code sensor means comprising a code sensor element mounted on said body such that said locations of said instrument successively pass said sensor element as said instrument is moved along said guideway and comparator means to receive an initial output from said sensor element and to compare subsequent instantaneous values of the output of said sensor element with the value of said initial output to derive said output signals indicative of code information at said code locations; and signal storage means to store signals provided by said sensor means.

9. Code identification apparatus as claimed in claim 8, wherein said code sensor element is a Hall Effect devide and said instrument includes one or more discrete magnetized portions at one or more of said locations to influence the electrical output of said Hall Effect device whereby to generate said output signals indicative of code information at said code locations.

10. Code identification apparatus as claimed in claim 9, wherein said signal storage means comprises a plurality of signal storage units at least equal in number to the number of code locations in said set and the reader further comprises control means responsive to progress of said instrument along said guideway to connect said storage units in succession to said code sensor element as said code locations of said instrument successively pass said code sensor element and means conditioned by withdrawal of said instrument from said guideway to extract the stored signals from said storage units.

* * * * *